United States Patent [19]

Jourdan-Laforte

[11] 3,900,555

[45] Aug. 19, 1975

[54] PROCESS FOR GENERATING AN OXIDIZING REAGENT FOR THE TREATMENT OF POLLUTED WATER

[75] Inventor: Eric Jourdan-Laforte, Ecully, France

[73] Assignee: L'Air Liquide, Societe Anonyme pour l'Etude et l'Exploitation des Procedes Georges Claude, Paris, France

[22] Filed: July 19, 1973

[21] Appl. No.: 380,815

[30] Foreign Application Priority Data
July 28, 1972 France .............................. 72.27359

[52] U.S. Cl. .................. 423/365; 204/1 T; 210/63; 423/513
[51] Int. Cl.² ...................... C02B 1/34; C01B 21/12
[58] Field of Search ........... 423/351, 513, 355, 365; 204/149; 210/63

[56] References Cited
UNITED STATES PATENTS

| | | |
|---|---|---|
| 3,042,488 | 7/1962 | Hildon et al. ...................... 423/513 |
| 3,203,756 | 8/1965 | Hildon et al. ...................... 423/513 |
| 3,502,576 | 3/1970 | Muller et al. ..................... 423/365 X |
| 3,510,424 | 5/1970 | Zumbrunn ....................... 423/365 X |
| 3,664,951 | 5/1973 | Armstrong ...................... 204/149 X |

Primary Examiner—John H. Mack
Assistant Examiner—A. C. Prescott
Attorney, Agent, or Firm—Browdy and Neimark

[57] ABSTRACT

A process for obtaining monopersulphuric acid from hydrogen peroxide and sulphuric acid is disclosed. Hydrogen peroxide in the form of an aqueous solution with a concentration ranging from 35 to 100% and either concentrated sulphuric acid or fuming sulphuric acid are added simultaneously to a reaction vessel. The temperature of the reaction is maintained in the range −10°C to +80°C and the supply of the hydrogen peroxide and sulphuric acid to the reaction vessel is controlled so that the generation of the monoperoxysulphuric acid occurs when required and the quantity thereof produced is adjusted according to the quantity thereof required for reaction with another reactant, for example a pollutant, the concentration of the monoperoxysulphuric acid being substantially constant.

6 Claims, 2 Drawing Figures

3,900,555

PROCESS FOR GENERATING AN OXIDIZING REAGENT FOR THE TREATMENT OF POLLUTED WATER

BACKGROUND OF THE INVENTION

This invention relates to a process and to an apparatus for generating an oxidizing reagent for inter alia the treatment of polluted water and more particularly is concerned with a process and with an apparatus for generating monoperoxysulphuric ions.

It is known that the monoperoxysulphuric anion ($HSO_5^-$) can be used for the detoxification, by oxidation, of impurities, especially cyanides, cyanhydrins, nitriles, phenols, dihydroxybenzenes, cresols, etc., contained in industrial waste water. It is also known that the monoperoxysulphuric anion can be used, either alone or in association with one or more halides, for the disinfection of water in swimming pools, reservoirs, etc. or for the sterilization of equipment such as feeding bottles, water bottles, etc. When the monoperoxysulphuric anion is used in association with one or more halides there occurs a well known reaction between the $HSO_5^-$ ion and the halide(s), which leads, depending on the pH of the medium, to the liberation of the corresponding halogen $Cl_2$, $Br_2$, $I_2$ or to the formation of the corresponding hypohalites.

Commercially, the monopersulphuric anion is found either in the form of relatively stable, dilute aqueous solutions which contain, as well as $HSO_5^-$, the $HSO_4^-$ and $NH_4^+$ ions, or in solid form as potassium monopersulphate which is sold in admixture with potassium sulphate and potassium bisulphate. It is often advantageous, either for economic reasons or in order to avoid secondary pollution effects such as those caused by the $NH_4$ ion, to employ solutions resulting from the reaction of sulphuric acid or fuming sulphuric acid on concentrated solutions of hydrogen peroxide but the monoperoxysulphuric acid solution which is obtained in this way is unstable and loses its active oxygen quickly, i.e. in a few hours.

There is therefore a need for a process and for a generator which enables one to produce the monoperoxysulphuric anion at the moment of use, i.e. before decomposition, in a quantity just sufficient to achieve the desired effect, and which permits the medium to be treated to be kept at a suitable pH value in order that the treatment can be carried out, possibly automatically, under optimum conditions.

SUMMARY OF THE INVENTION

According to the invention, starting with hydrogen peroxide and sulphuric acid, monoperoxysulphuric acid is obtained, the generation of which is instantaneous at the moment of use and the emission is quantitatively adjusted to the concentration of the toxic impurity to be destroyed in the effluent by oxidation, the concentration of the monoperoxysulphuric acid being constant. The reaction temperature is between $-10°C$ and $80°C$, and the hydrogen peroxide, in the form of an aqueous solution of a concentration which is between 35 and 100%, preferably at least 50%, and the sulphuric acid in the form of a concentrated industrial solution or fuming sulphuric acid, the said reagents being added simultaneously.

DESCRIPTION OF THE PREFERRED EMBODIMENTS

Figure 1:
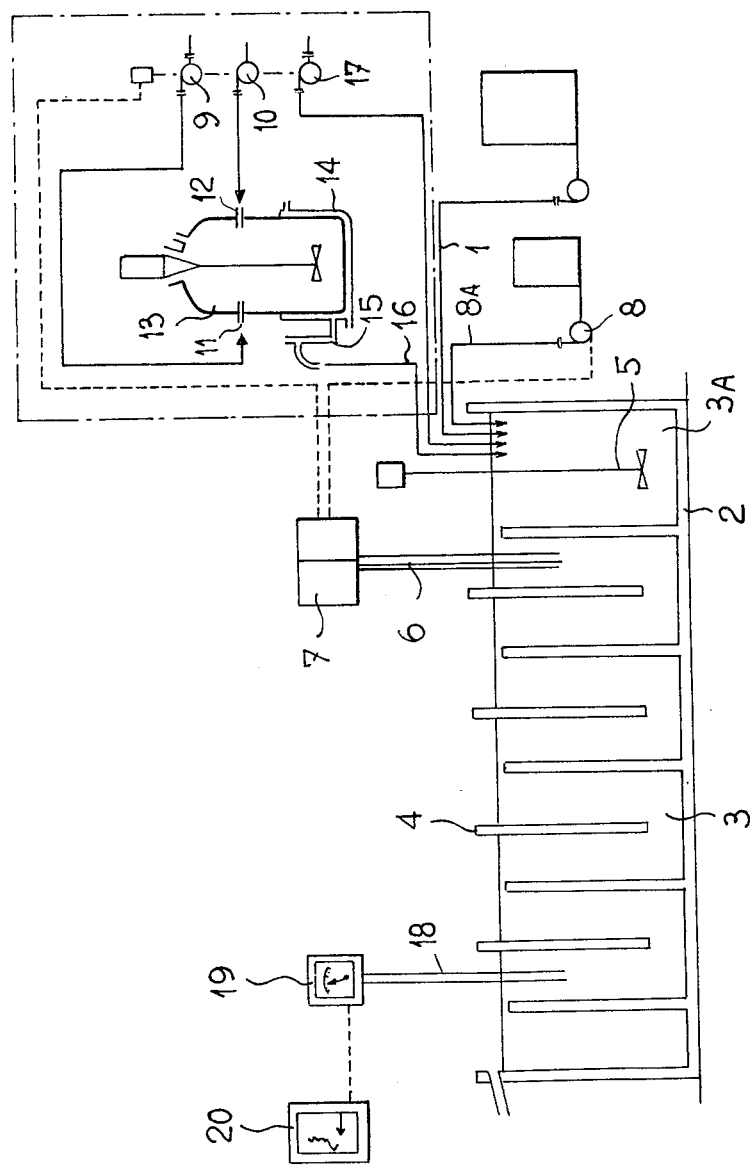

According to one method of carrying out the process of the invention, the regulation of the generation of monoperoxysulphuric acid is effected by using an electrochemical signal which varies with the concentration of the impurity of the toxic effluent to be destroyed by oxidation.

When the toxic impurity to be destroyed is especially the $CN^-$ anion in the form of a simple or complex cyanide, the signal used for the regulation is the sudden variation in potential at the terminals of a pair of redox electrodes, depending on whether the medium is reducing in the prresence of traces of $CN^-$ ion or oxidizing in the presence of a slight excess of monoperoxysulphuric acid.

The reaction can be carried out continuously in a constant level reactor which is placed above a tank in which the effluent to be cleansed is circulating, by simultaneously adding the hydrogen peroxide and the sulphuric acid; the reactor vessel overflows and a certain quantity of monoperoxysulphuric acid flows into the toxic effluent to be treated; with the concentration of reagents and the reaction temperature being suitably chosen according to the invention, the formation of the monoperoxysulphuric acid is quasi-instantaneous and the concentration of monoperoxysulphuric acid in the reactor remains constant.

According to one embodiment of the invention, the reagents, $H_2O_2$ and $H_2SO_4$, can be added to the reactor by means of proportioning pumps, of which the starting and stopping are dependent on the appearance of the toxic impurity in the water to be treated, or the disappearance of said impurity therefrom. There is thus available a source of monoperoxysulphuric acid which is exactly adjusted to the rate of flow of toxic impurity, the measuring of this impurity in the water being effected by conventional means and being finally shown as an electric signal.

Furthermore, the acidity introduced by the monoperoxysulphuric acid solution in the effluent to be cleansed is simultaneously and immediately neutralized by a solution of alkali agent introduced in a controlled quantity, the introduction of the alkali agent being dependent on that of the monoperoxysulphuric acid. The sulphuric acid proportioning pump is coupled with another pump which permits an alkali agent solution to be added to the water to be treated at such a rate that the acidity introduced by the $H_2SO_5$ solution is neutralized.

In general, the reaction temperature is close to ambient temperature, but it can without any inconvenience reach 60° to 80°C or can even be close to or below 0°C.

The sulphuric acid is preferably the 60° Be industrial solution or 20% fuming sulphuric acid, the presence of a ferric impurity not being harmful.

The hydrogen peroxide is in the form of industrial aqueous solutions with concentrations which are between 35 and 100%, preferably 70 to 85%. In fact, the higher the concentration of the reagents, the better is the rate of conversion into peroxy acid.

The synthesis reactor of the $HSO_5$ anion can be of the double jacket container type equipped with a mechanical agitator or of the static mixer type. It is made of materials which are compatible with the reagents being used, such as glass, stainless steel, etc.

The installation for cleansing polluted water comprises the oxidizing anion generator associated with a tank for the treatment of polluted effluents, equipped with automatic regulating devices relating to the concentration of the impurity to be destroyed.

The installation can be applied to the continuous or intermittent cleansing of industrial waste effluents, the toxic impurities of which can be destroyed by oxidation.

The treatment process for polluted water according to the invention is also applicable to the sterilization of water or material utilizing the antibacterial properties of the monoperoxysulphuric anion or those of halogens in free form or in hypohalite form, obtained by reaction of the monoperoxysulphuric ion on a halide in neutral or alkali medium.

Figure 2:
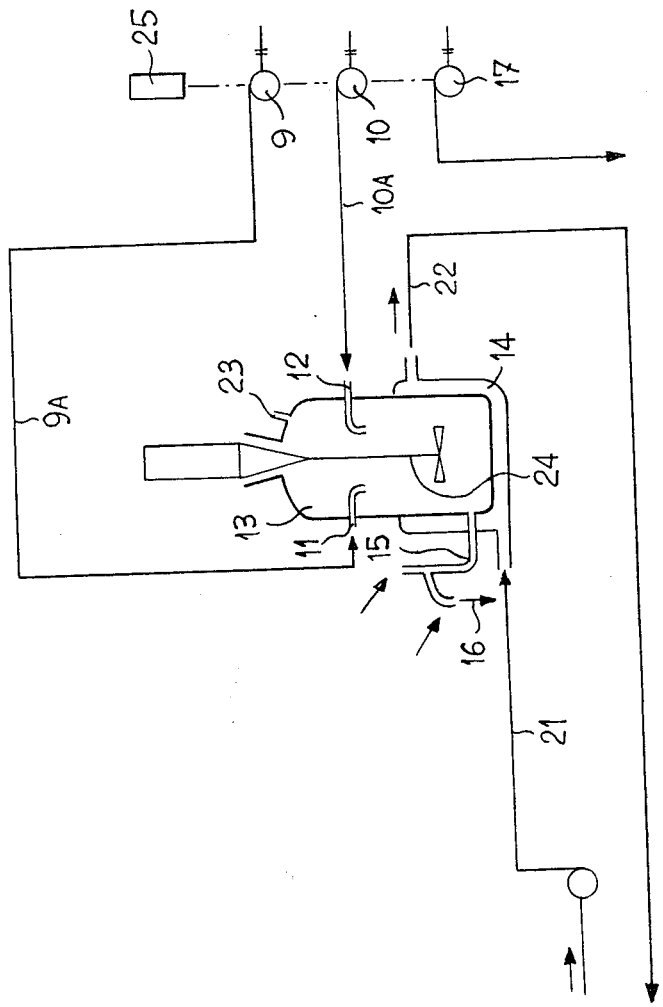

For a better understanding of the invention, and to show how the same may be carried into effect, reference will now be made by way of example to the accompanying drawings in which FIGS. 1 and 2 show diagrammatically an installation according to the present invention.

A cyanide-containing effluent coming from a storage tank and after passing through a pump arrives by way of a pipe 1 at a tank 2 having several compartments 3 separated from each other by partitions 4 arranged in baffle formation. In the first compartment, 3A, the solution is vigorously agitated by means of an agitator 5 and as it leaves this compartment it passes in contact with an assembly of three electrodes 6 arranged downstream of the first compartment. The three electrodes comprise a calomel reference electrode, a gold or silver electrode, and a glass electrode. The reference glass electrode pair, via a regulating millivoltmeter pH meter which controls a proportioning pump 8 responsible for the circulation of a sodium hydroxide solution supplied through a conduit 8A, permits the pH of the cyanide containing effluent to be treated at pH 9, this being the pH value which is the optimum for the destruction by oxidation of cyanides by the $HSO_5^-$ anion.

The reference-gold electrode pair assumes a negative potential in the presence of a slight excess of $CN^-$. Variation in this negative potential permits, via a regulating millivoltmeter 7, the control of three proportioning pumps. Two of the proportioning pumps, 9 and 10, make it possible via inlets 11 and 12 to add sulphuric acid and hydrogen peroxide to a reactor 13 which can, for example, be placed above the first compartment of the treatment tank 2. The reactor 13 comprises small double-jacket container 14 made of glass and provided, at its base, with a swan-neck 15 which permits overflow and the maintenance of a constant level. The reagents introduced at 11 and 12 are supplied to the reactor in such a way that the molar ratio $H_2SO_4/H_2O_2$ leads to the most economical solution of monopersulphuric acid. The monopersulphuric acid solution leaves the reactor via the circuit 16, the strength of this solution depending on the molar ratio of reagents. The third proportioning pump 17 is coupled to the other two proportioning pumps so that it delivers into the effluent treatment tank 2 a concentrated solution of sodium hydroxide or milk of lime with a rate of flow such that the acidity of the oxidizing solution is substantially neutralized.

When the pair of redox gold-calomel electrodes at 6 detects the presence of $CN^-$ ions which are free or in the form of complex ions, the regulator 7 starts up the proportioning pumps. A certain quantity of reagents is added to the reactor 13, which permits the flow, by overflow, of the corresponding quantity of monoperoxysulphuric acid which quickly reacts with the cyanide ions which are present. The potential varies in the reverse sense and when it passes beyond the reference point, the pumps stop and the addition of monopersulphuric acid also stops.

It is possible to check, along the flow path of the treated effluent at a distance such that the residence time is of the order of 15 minutes, that the $CN^-$ concentration is practically zero i.e. <0.01 ppm. This check can be effected either by conventional methods using for example colorimetric measurements of the $CN^-$ ion in water or by a second pair of redox electrodes 18, of which the response is recorded, by using an electrode specific to the $CN^-$ ion. The electrode is connected to a control millivoltmeter 19 and the latter is connected to a recorder 20, the assembly being placed to the outlet from the treatment tank 2.

The invention is illustrated by the following Example.

EXAMPLE

An industrial effluent from an electroplating plant was treated continuously for 5 hours at the rate of 235 liters per hour using the installation shown in the accompanying drawings. The effluent was a rinsing water containing 35 ppm of cyanide ions in the form of zinc cyanide associated with sodium cyanide. The effluent was injected into the first compartment of the treatment installation which compartment had a capacity of 4.5 liters and was vigorously agitated therein by a turbine in the presence of caustic soda and monopersulphuric acid.

The monopersulphuric acid, and also the quantity of caustic soda theoretically necessary for neutralizing it, originated respectively from the monopersulphuric acid generator 13 and from the proportioning pump 17 which was coupled with the two proportioning pumps feeding the acid generator.

A quantity of caustic soda, sufficient to establish a pH of 9 in the treatment tank, was introduced into the first compartment by the proportioning pump 8 which was coupled to the pH meter at 7 which was regulated to pH 9 and controlled by the calomel glass electrode pair 6 dipping into this first compartment.

The monoperoxysulphuric acid generator, with an effective volume of 20 ml, is shown in more detail in FIG. 2 of the accompanying drawings and comprised the constant-level reactor 13 having a double glass jacket inside which jacket circulated a cooling liquid, preferably water, via the circuits 21 and 22. The reactor 13 was equipped with a device which permits the overflow and maintenance of a constant level, such as the swan-neck 15 starting at its base. Degasification was provided by the swan-neck 15 and by an opening 23 at the upper part of the reactor. The reactor was also equipped with an agitator 24 for homogenizing the reagents and improving the heat exchanges.

The monoperoxysulphuric acid generator 13 was supplied with 66° Be sulphuric acid and 70% hydrogen peroxide through the two proportioning pumps 9 and 10, both coupled to the same motor 25 which is controlled through the millivoltmeter 7 having a reference point connected to the terminals of a pair of redox electrodes such as calomel-gold (or silver) electrodes 6. The respective reagents, hydrogen peroxide and sulphuric acid, after transfer through the conduits 9A and 10A, are introduced through the two supply pipes 11 and 12 arranged symmetrically in the upper part of the generator.

The pumps are regulated so as to be able to deliver, firstly, 150 ml/hour of sulphuric acid and 54 ml/hour of hydrogen peroxide thereby to synthesize in the reactor 1 mol/hour of monopersulphuric acid in the form of a 31% by weight solution and secondly 450 ml/h of 30% by weight caustic soda.

The metallic control electrode dips into the third compartment of the treatment tank so as to read the potential of the effluent undergoing destruction after a reaction time of 3 minutes.

The reference electrode is common with the pH electrode. The millivoltmeter with a reference point is calibrated at −60 mV. While the potential between the calomel-gold electrodes is below this value, the generator synthesizes the monopersulphuric acid and delivers it into the first compartment of the treatment tank. When the potential becomes higher than this value, the generator is stopped.

The potential difference of a specific electrode of the CN⁻ ion placed in the tenth compartment of the treatment tank, with reference to the calomel electrode, i.e. after a reaction time of 10 minutes, is continuously recorded and indicates a concentration lower than 1/100 ppm of CN⁻ in the rejected water, this being verified by chemical measurements by the Aldrige method, carried out periodically.

Under the conditions described in the example, the total destruction of the cyanide ions consumed 668 g of 92% sulphuric acid, 164 g of 70% hydrogen peroxide and 1819 g of 10.1 N caustic soda.

I claim:

1. A process for obtaining monoperoxysulphuric acid from hydrogen peroxide and sulphuric acid and automatically controlling the content of oxidizable impurity in an aqueous medium by oxidizing the impurity with the monoperoxysulphuric acid, comprising:

simultaneously adding to a reaction vessel (1) hydrogen peroxide in the form of an aqueous solution with a concentration ranging from 35–100% and (2) concentrated sulphuric acid or fuming sulphuric acid;

maintaining the temperature in the reaction vessel in the range of −10° C to +80° C;

allowing the contents of the reaction vessel to overflow into the aqueous medium having oxidizable impurity therein;

monitoring the oxidizable impurity content of the aqueous medium downstream of the point of entry of said overflow into the aqueous medium; and controlling the amount of reactants added in said adding step in response to the concentration of the oxidizable impurity monitored in said monitoring step;

whereby the supply of hydrogen peroxide and sulphuric acid to the reaction vessel is so controlled that the generation of monoperoxysulphuric acid occurs only when required and the quantity thereof produced is adjusted according to the quantity thereof required for reaction with said oxidizable impurity.

2. A process in accordance with claim 1 wherein, in said adding step, addition of fixed proportions of hydrogen peroxide to sulphuric acid are added whenever said adding step is activated by said controlling step.

3. A process in accordance with claim 1, further including the steps of:

adding alkali agent to the aqueous medium in a quantity controlled to exactly neutralize the monoperoxysulphuric acid entering the aqueous medium.

4. A process in accordance with claim 3, wherein said controlling step further serves to control the amount of alkali agent added to the aqueous medium to a predetermined proportion of the reactants added to the reaction vessel.

5. A process according to claim 1, wherein the oxidizable impurity is the CN⁻ anion in the form of a simple or complex cyanide, and wherein said monitoring step comprises monitoring the sudden variation in the potential at the terminals of a pair of redox electrodes, said variations occurring according to whether the medium is reducing in the presence of traces of CN⁻ ion or oxidizing in the presence of a slight excess of monoperoxysulphuric anion.

6. A process for treating an aqueous medium containing oxidizable impurities, which process comprises measuring continuously the concentration of said oxidizable impurities in said aqueous medium and, when the measurements indicate that the concentration of said oxidizable impurities exceeds a predetermined value, introducing into said aqueous medium from a reaction vessel, monoperoxysulphuric acid in a quantity just sufficient to oxidize said oxidizable impurities, said monoperoxysulphuric acid being formed by adding simultaneously to said reaction vessel hydrogen peroxide in the form of an aqueous solution with a concentration ranging from 50% to 100% and one of concentrated sulphuric acid and fuming sulphuric acid, the temperature of the reaction being maintained in the range of −10°C to +80° C. and the supply of said hydrogen peroxide and sulphuric acid to said reactor occurring only when said measurements indicate that the concentration of said oxidizable impurities exceeds said predetermined value.

* * * * *